No. 754,521. PATENTED MAR. 15, 1904.
E. C. VALE.
SEPARABLE LINK.
APPLICATION FILED JUNE 5, 1903.
NO MODEL.
FIG. 1.
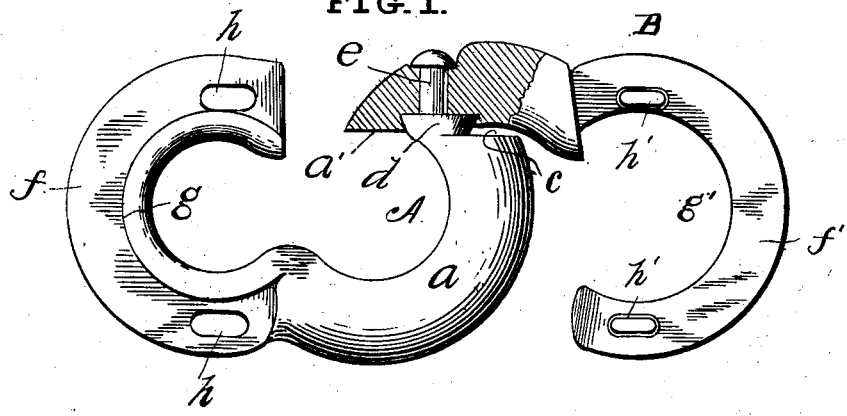
FIG. 2.
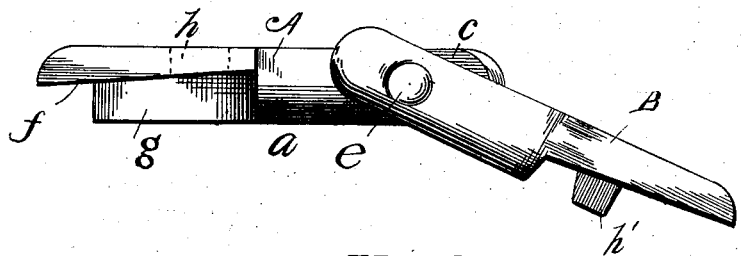
FIG. 3.
FIG. 4. FIG. 5.
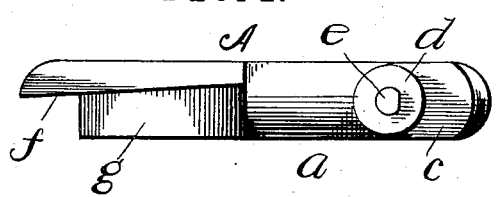 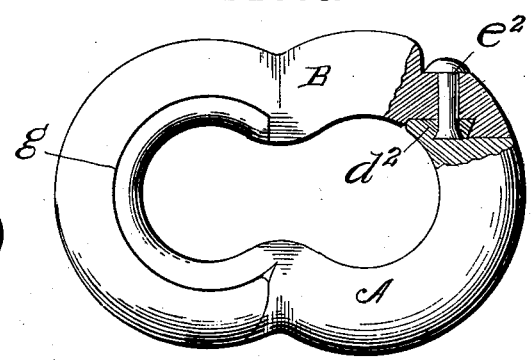
WITNESSES: INVENTOR
Chas. K. Davis. E. C. Vale
M. E. Brown BY W. A. Bartlett
Attorney
THE NORRIS PETERS CO., PHOTO-LITHO., WASHINGTON, D. C.

No. 754,521. Patented March 15, 1904.

UNITED STATES PATENT OFFICE.

ELI C. VALE, OF EAST CARMEL, OHIO.

SEPARABLE LINK.

SPECIFICATION forming part of Letters Patent No. 754,521, dated March 15, 1904.

Application filed June 5, 1903. Serial No. 160,243. (No model.)

*To all whom it may concern:*

Be it known that I, ELI C. VALE, a citizen of the United States, residing at East Carmel, in the county of Columbiana and State of Ohio, have invented certain new and useful Improvements in Separable Links, of which the following is a specification.

This invention relates to separable or hinged links for chains, couplings, and the like.

The object of the invention is to produce a link, preferably from cast or drop-forged metal, which shall be simple, strong, and easily opened or closed and in which the two hooks composing the link shall mutually brace and support each other and in which the joint or hinge shall have a specially strong construction.

The invention consists in the constructions and combinations hereinafter set forth.

Figure 1 is a side elevation of the link opened, with the hinge shown in section. Fig. 2 is an edge view of the link opened, but not to full extent. Fig. 3 is an edge view of one member of the link, and Fig. 4 is an edge view of the other member. Fig. 5 is a view of the link closed, with hinge in section.

The link is composed of two hooks or members A and B. The hook or member A is in outline nearly the form of a figure 3, as is shown in Fig. 1. The bar $a$ of this hook is rounded and curved and has a flat end $c$, from which end the pintle or hinge-pin projects. The part $d$ of the pintle is integral with hook A and is substantially in the form of the frustum of a cone, with the small end toward the flat face $c$. The outer end of this part $d$ of the pintle thus overhangs the inner end. The part $e$ of the pintle is substantially cylindrical save for a slight flatness at the rear and projects from the flat outer face of the frustum $d$. The part $e$ may be a rivet, as indicated in Fig. 5. The curved part of hook A remote from the pintle is flattened for a part of its width or thickness, leaving a flange $f$ at one side of the curved part of the hook. The face of said flange toward which the sister hook B will fold is nearly flat, but inclined with reference to the plane of either face of the hook A. The part $g$ of the body A alongside of the flange $f$ is very nearly the segment of a cylinder on its external surface. The inner faces of the hook or member A are rounded, as is common with hooks of this class. The flange $f$ is shown with holes at $h\ h$. The pintle $d\ e$ has its axis in the plane of the central body of the link and projects laterally with reference to the hook.

The hook or member B is complementary to the hook or member A. The stem of the hook B has a flat face $a'$ and a hole or opening, which is undercut to embrace the frustoconical pintle $d$ of the member B. The stem has a countersunk hole to receive the pintle $e$, and when the parts are assembled this pintle is slightly headed or riveted down. The conic frustum and undercut shoulder are cut away enough to permit of assembling of the parts when the link is open; but when closed the undercut shoulder on hook B interlocks with the frustum $d$ on hook A, and thus any force tending to push the hook B off from the pintle $e$ is resisted.

The hook B has a rounded body near the joint portion, but has a flat face $f'$, which turns against the face of flange $f$ of the hook A, and the open part $g'$ fits the nearly-cylindrical part $g$ of the sister hook when the parts are turned together.

Pins $h'\ h'$ on hook B enter holes $h\ h$ on hook A when the parts are turned to closed position.

The link opens and closes by turning the part B on pintle $d\ e$, as will be understood from the construction. When closed, the parts are braced against strain in every direction except the opening swing, and when the members $f\ f'\ g\ g'$ are inclosed in a ring or chain-link the parts are absolutely locked together.

The figure-8 form of link is preferred, as securing connection with other rings or links with reasonable certainty that the links will all draw in the direction of their length and not kink.

When the link is closed, the body, composed of the two hooks A B, will be symmetrical and of about uniform diameter.

As the pintle or rivet *e* is slightly flattened on its rear face, the draft when the ring is closed will be entirely on the pintle *d*.

What I claim is—

1. A link of the character described, consisting essentially of two hooks, hinged together by an integral pintle projecting from one hook, said pintle being substantially the frustum of a cone, with its large end outward, the other hook or member having an opening with an undercut shoulder embracing said pintle.

2. A link of the character described, having its body composed of two hooks, one of said hooks having an integral pintle, undercut at its outer end, and a rivet projecting centrally from said undercut pintle, and the other hook swiveled on said pintle so as to swing open by a side movement, and interlocking with said undercut pintle and rivet by a hole conforming thereto.

3. In a separable link, the hook member having an integral undercut pintle at one end and a flattened face and side projecting curved flange at the curved end, and a second member having an undercut shoulder around the opening which embraces the pintle, and a substantially cylindrical opening which closes over said flange on the complementary hook, and a flat face to close against the flattened body of the sister hook.

4. A separable link having two hooks connected by an integral pintle on one hook entering an opening in the other hook, and a smaller pintle forming a continuation at the outer end of the first pintle, entering but not filling the opening of the sister hook at the rear side.

In testimony whereof I affix my signature in presence of two witnesses.

ELI C. VALE.

Witnesses:
LOUIS T. FARR,
W. A. MCARTOR.